United States Patent [19]

Triantafyllis

[11] Patent Number: 5,709,830
[45] Date of Patent: Jan. 20, 1998

[54] METHOD FOR WINGED OR WINGLESS TYPE PRECURE TREAD PRODUCTION

[75] Inventor: Spiros Apostolou Triantafyllis, Thessaloniki, Greece

[73] Assignee: The Goodyear Tire & Rubber Company, Akron, Ohio

[21] Appl. No.: 605,418

[22] Filed: Feb. 22, 1996

[51] Int. Cl.$^6$ .................................. B29C 35/02
[52] U.S. Cl. .................. 264/219; 264/36; 264/326; 425/17; 425/195; 156/96
[58] Field of Search ................ 425/183, 185, 425/193, 195, 47; 156/96; 264/36, 315, 326, 219

[56] References Cited

U.S. PATENT DOCUMENTS

| | | | |
|---|---|---|---|
| 1,482,325 | 1/1924 | Shively | 264/326 |
| 2,298,729 | 10/1942 | Zimmerman. | |
| 2,333,588 | 11/1943 | Schaevitz. | |
| 3,082,480 | 3/1963 | Balle. | |
| 3,608,602 | 9/1971 | Youngblood | 152/212 |
| 3,692,090 | 9/1972 | Brobeck et al.. | |
| 3,779,830 | 12/1973 | Reppel | 156/394 |
| 4,691,431 | 9/1987 | Hayata | 425/28.1 |
| 4,992,035 | 2/1991 | Holroyd et al. | 425/195 |
| 5,120,209 | 6/1992 | MacMillan | 425/40 |
| 5,186,952 | 2/1993 | Lo et al. | 425/36 |
| 5,208,044 | 5/1993 | Miyata et al. | 425/32 |

*Primary Examiner*—Mathieu D. Vargot
*Attorney, Agent, or Firm*—Roger D. Emerson

[57] ABSTRACT

A method and apparatus for producing both wing-type and wingless tire treads from a single mold. The mold includes a main portion, a pair of first inserts which are selectively attachable to the main portion. The pair of first inserts is capable of molding wingless treads. A pair of second inserts can be selectively secured to the main portion in place of the first pair of inserts to mold wing-type treads. The method for converting a wingless tire tread mold to a wing-type tire tread mold includes the steps of removing the pair of first inserts from the main portion of the mold and securing the pair of second inserts to the main portion of the mold with the securing apparatus.

1 Claim, 2 Drawing Sheets

5,709,830

METHOD FOR WINGED OR WINGLESS TYPE PRECURE TREAD PRODUCTION

BACKGROUND OF THE INVENTION

This invention pertains generally to the art of apparatuses and methods of manufacturing either winged or wingless precured tire treads, and more specifically to the use of an insert to allow the use of a common mold for either winged or wingless tire treads. The traditional method of manufacture of conventional flatbase precure treads utilizes a flat metal matrix, press platens, a layer of unvulcanized rubber applied within the matrix and between the press platens, and rubber contoured into a vulcanized tread configuration by means of compression molding at an elevated temperature. The current marketplace provides for precure tire tread products with and without wings. The absence of wings is typical of conventional precure. Use of wings is intended to yield a finished retread product with the appearance of a full cap or mold cure retread, with rubber being vulcanized down a part of the casing shoulder and upper sidewall.

Traditional technology requires two molds to manufacture each of the distinct retread products, winged and wingless precure. Alternatives include manufacturing the wing type and cutting off the wing for those who do not prefer to purchase and use wing type tread. This process is time consuming and results in costly scrap which adversely affects the cost of the product and, possibly, the appearance.

The present invention contemplates a new and improved removable mold insert which is simple in design, effective in use, and overcomes the foregoing difficulties and others while providing better and more advantageous overall results.

SUMMARY OF THE INVENTION

In accordance with the present invention, a new and improved removable mold insert is provided which converts a mold for wing type precure tread production to a mold for wingless type precure tread production.

More particularly, in accordance with the present invention, a mold for wing type tire tread production includes a main portion having a cavity for molding tire treads, a wing portion having grooves adjacent to the main cavity for molding wings, an insert fitting into the grooves and allowing the mold to be used for wingless type tire tread production, and securing means for securing the insert to the mold.

According to one aspect of the present invention, an insert for use with a mold for wing type tire tread production includes fitting means for fitting the insert into grooves of the mold and securing means for securing the insert to the mold.

According to another aspect of the invention, a method for converting a wing type tire tread mold to a wingless type tire tread mold, the mold includes a main portion having a main cavity, a wing portion having grooves adjacent to the main cavity, an insert and securing means. The method includes the steps of inserting the insert into the grooves of the wing type mold and securing the insert with the securing means.

One advantage of the present invention is that it provides the capability to make wing and wingless type precure tire treads from the same mold.

Another advantage of the present invention is that wing type precure tire treads will no longer have to be trimmed to remove the wings.

Another advantage of the present invention is that the insert is easily removable to facilitate the changing of the mold from a wingless type to wing type mold.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
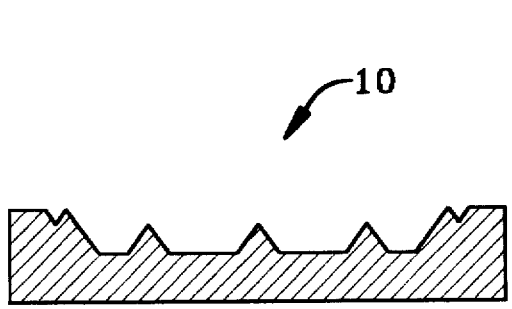
FIG. 1 shows an end view of a conventional mold without the inserts of the invention.

Referring now to the drawings, which are for purposes of illustrating a preferred embodiment of the invention only, and not for purposes of limiting the invention, FIG. 1 shows an end view of a conventional, flatbase, precure tire tread mold 10.

Figure 2:
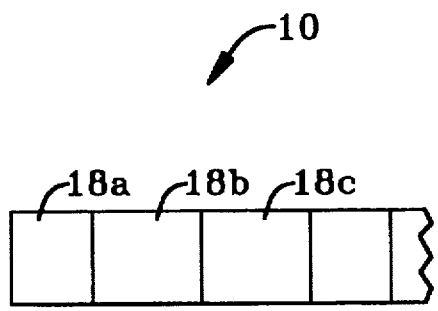
FIG. 2 shows a side view of the conventional mold illustrated in FIG. 1.
Figure 4:
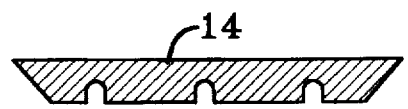
FIG. 4 shows an end view of a tread without wings as made by the mold of FIG. 3.

With reference to FIG. 2, a side view of the mold 10 of FIG. 1, a series of mold segments 18a, 18b, 18c can be operatively connected together to produce a flatbase, precure tread mold 10 of the desired length. The mold segments 18a, 18b, 18c are generally between 2 inches long and 6 inches long. The mold 10 illustrated in FIG. 1 is a single piece mold 10 and makes treads 14 without wings, as illustrated in FIG. 4.

Figure 3:
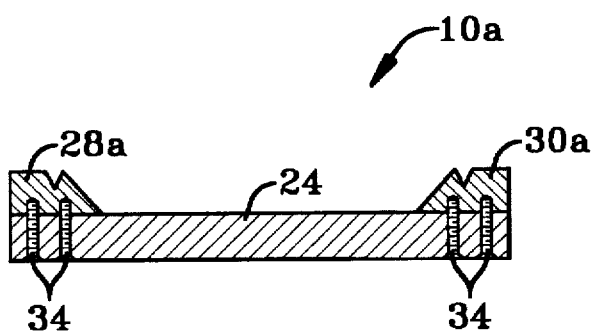
FIG. 3 shows a cross-sectional view of a mold with inserts according to the invention, the inserts illustrated capable of making a tread without wings.

With reference to FIG. 3 a flatbase, precure tire tread mold 10a according to the invention is illustrated. The mold 10a of FIG. 3 is not a single piece, but instead includes a main portion 24 and inserts 28a,30a. The inserts 28a,30a are selectively attached to the main portion 24 by screws 34. While screws 34 are the preferred attaching means, other suitable attaching means such as adhesives, bolts, spring-loaded mechanical devices chosen with sound engineering judgment can be used. The inserts 28a,30a illustrated in FIG. 3 produce a flat-base tread 14 without wings as illustrated in FIG. 4.

Figure 5:
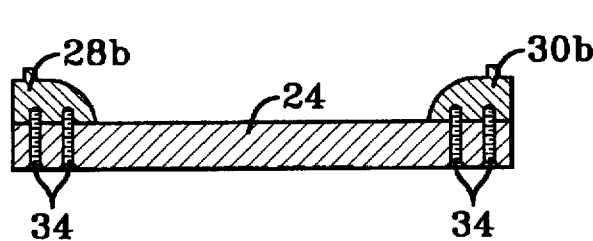
FIG. 5 shows a cross-sectional view of a mold with a second embodiment of inserts according to the invention, the illustrated inserts capable of making a tread with wings.
Figure 6:
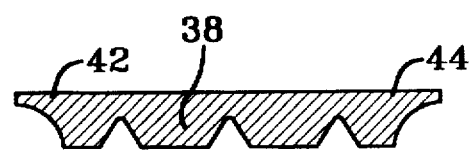
FIG. 6 shows an end view of a tread with wings as made by the mold of FIG. 5.

With reference to FIGS. 5 and 6, the mold 10c of FIG. 5 includes the same main portion 24 of FIG. 3, but includes different inserts 28b,30b. The inserts 28b,30b produce the wing-type tread 38 of FIG. 4. The wing-type tread 38 features wings 42,44. Because the inserts 28a,30a,28b,30b are much cheaper to make than the main portion 24, a net cost savings is obtainable through the use of the invention. Prior to the invention, in order to make both a wingless precure tread and a wing-type precure tread, two molds 10 would be required. With the invention, a single main portion 24 and two sets of inserts are required to make both wingless treads 14 and wing-type treads 38. Inserts 28a,30a are used to make a wingless tread 14 and inserts 28b,30b are used to make a winged tread 38.

With reference to FIGS. 1,3 and 5, an insert 28a,30a,28b,30b is typically made by casting or machining and is typically made of metal. The mold 10 is typically made of cast aluminum and the insert 28a,30a,28b,30b is typically made of a metal compatible with the cast aluminum. The compatibilities must include rate of thermal expansion, since the mold 10 and insert 28a,30a,28b,30b are heated and cooled repeatedly.

Figure 7:
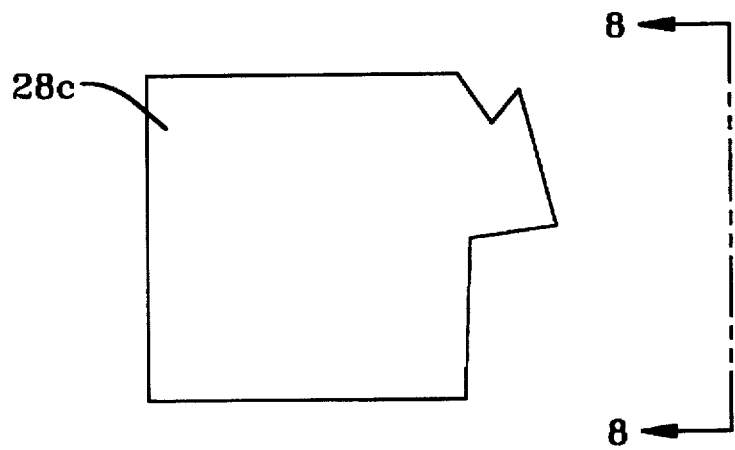
FIG. 7 shows a front view of an insert.
Figure 8:
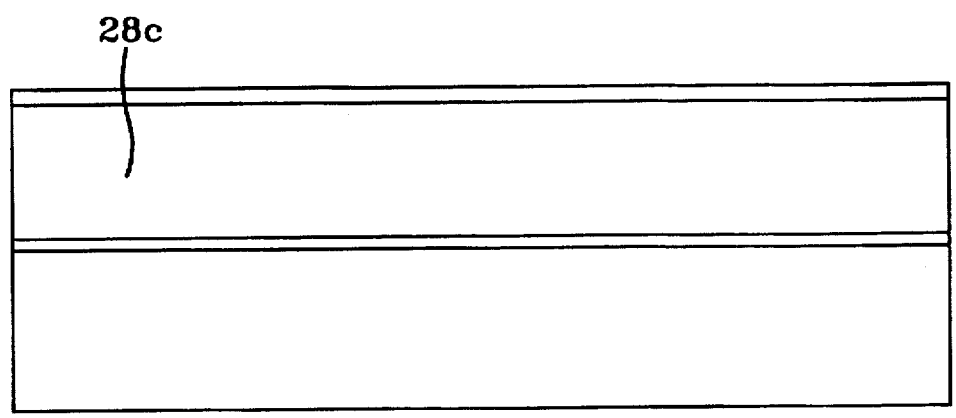
FIG. 8 shows a side view of the insert of FIG. 7.

With reference to FIG. 7, a front view of an insert 28c designed to fit into a mold 10 is illustrated. The insert 28c preferably has a height of 22 mm and width of 28 mm. FIG. 8 shows a side view of the insert 28c. The preferred embodiment of the insert 28c has a length of 76 mm.

Figure 9:
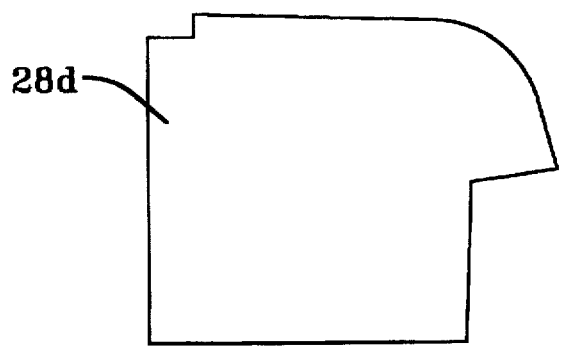
FIG. 9 shows a front view of another embodiment of an insert.

FIG. 9 shows a front view of another embodiment of an insert 28d. The insert 28d preferably has a height of 22 mm and width of 28 mm. The inserts 28a,28b,28c,28d have different shapes to form different designs of precure treads 14,38. The embodiment of the insert 28c shown in FIG. 8 preferably has a length of 76 mm.

While certain representative embodiments and details have been shown for the purpose of illustrating the invention, it will be apparent to those skilled in the art that various changes and modifications may be made therein without departing from the spirit or scope of the invention.

What is claimed is:

1. A method for converting a wingless tire tread mold to a winged tire tread mold, said mold comprising a main portion capable of forming a ground engaging surface of an associated precured tread, a first pair of inserts capable of producing lateral edges of said associated precured tread without wings, a second pair of inserts capable of producing lateral edges of said associated precured tread with wing portions, and securing means for alternatively and selectively securing said first and second pairs of inserts to said main portion, said method comprising the steps of:

securing said first pair of inserts to said main portion to form said wingless tire tread mold;

utilizing said wingless mold to produce said associated wingless tread;

removing said first pair of inserts from said main portion;

securing said second pair of inserts to said main portion to convert said wingless tire tread mold to said winged tire tread mold; and, utilizing said winged mold to produce said associated winged tread.

* * * * *